United States Patent
Glos

(10) Patent No.: US 10,870,723 B2
(45) Date of Patent: Dec. 22, 2020

(54) PRODUCTION OF POLYURETHANE FOAM

(71) Applicant: Evonik Operations GmbH, Essen (DE)

(72) Inventor: Martin Glos, Borken (DE)

(73) Assignee: Evonik Operations GmbH, Essen (DE)

( * ) Notice: Subject to any disclaimer, the term of this patent is extended or adjusted under 35 U.S.C. 154(b) by 299 days.

(21) Appl. No.: 15/580,191

(22) PCT Filed: Jul. 6, 2016

(86) PCT No.: PCT/EP2016/065895
§ 371 (c)(1),
(2) Date: Dec. 6, 2017

(87) PCT Pub. No.: WO2017/005760
PCT Pub. Date: Jan. 12, 2017

(65) Prior Publication Data
US 2018/0162982 A1  Jun. 14, 2018

(30) Foreign Application Priority Data

Jul. 7, 2015 (EP) .................................... 15175631

(51) Int. Cl.
*C08G 18/40* (2006.01)
*C08G 18/48* (2006.01)
(Continued)

(52) U.S. Cl.
CPC ....... *C08G 18/4018* (2013.01); *C08G 18/165* (2013.01); *C08G 18/1808* (2013.01); *C08G 18/2018* (2013.01); *C08G 18/225* (2013.01); *C08G 18/242* (2013.01); *C08G 18/246* (2013.01); *C08G 18/4027* (2013.01); *C08G 18/4211* (2013.01); *C08G 18/4816* (2013.01); *C08G 18/4829* (2013.01); *C08G 18/548* (2013.01); *C08G 18/7664* (2013.01);
(Continued)

(58) Field of Classification Search
CPC ............. C08G 18/165; C08G 18/1808; C08G 18/2018; C08G 18/225; C08G 18/242; C08G 18/246; C08G 18/4018; C08G 18/4027; C08G 18/4211; C08G 18/4816; C08G 18/4829; C08G 18/548; C08G 18/7664; C08G 2101/0025; C08G 2101/005; C08G 2101/0083; C08J 9/228; C08J 2205/10

See application file for complete search history.

(56) References Cited

U.S. PATENT DOCUMENTS 2,540,885 A  2/1951 Alton et al.
2,540,886 A  2/1951 Alton et al.
(Continued)

FOREIGN PATENT DOCUMENTS

CN   103044687 A   4/2013
CN   103055759 A   4/2013
(Continued)

OTHER PUBLICATIONS

European Search Report dated Nov. 30, 2015 in EP 15175631.9 (8 pages).
(Continued)

*Primary Examiner* — John M Cooney
(74) *Attorney, Agent, or Firm* — Taylor English Duma LLP; Philip P. McCann

(57) ABSTRACT

Compositions suitable for production of polyurethane foams, comprising at least one OH-functional compound (OHC) obtainable by the partial or complete hydrogenation of ketone-aldehyde resins, wherein the OH-functional compound contains at least one structural element of the formula (1a) and optionally of the formulae (1b) and/or (1c),

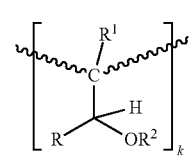

1a

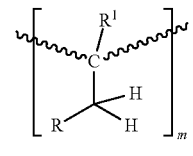

1b

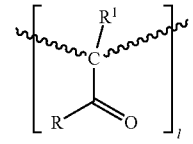

1c with
R=aromatic with 6-14 carbon atoms, (cyclo)aliphatic with 1-12 carbon atoms,
$R^1$=H, $CH_2OH$,
$R^2$=H, or a radical of the formula —$(CH_2$—$CH(R')O$—$)_y$—H
where R' is hydrogen, methyl, ethyl or phenyl and y=1 to 50,
k=2 to 15, preferably 3 to 12, more preferably 4 to 11,
m=0 to 13, preferably 0 to 9,
l=0 to 2,
where the sum of k+l+m is from 5 to 15, preferably from 5 to 12, and k>m, are described.

18 Claims, No Drawings

(51) Int. Cl.
  *C08G 18/54* (2006.01)
  *C08G 18/76* (2006.01)
  *C08G 18/18* (2006.01)
  *C08G 18/20* (2006.01)
  *C08G 18/22* (2006.01)
  *C08G 18/24* (2006.01)
  *C08G 18/42* (2006.01)
  *C08G 18/16* (2006.01)
  *C08J 9/228* (2006.01)
  *C08G 101/00* (2006.01)

(52) U.S. Cl.
  CPC ........ *C08J 9/228* (2013.01); *C08G 2101/005* (2013.01); *C08G 2101/0025* (2013.01); *C08G 2101/0083* (2013.01); *C08J 2205/10* (2013.01)

(56) References Cited

U.S. PATENT DOCUMENTS

| | | |
|---|---|---|
| 3,329,654 A | 7/1967 | Schwarzhans |
| 3,838,109 A | 9/1974 | Buisson et al. |
| 3,900,424 A | 8/1975 | Inoue et al. |
| 3,953,383 A | 4/1976 | Inoue et al. |
| 4,500,474 A | 2/1985 | Kruper, Jr. et al. |
| 4,731,434 A | 3/1988 | Doerffel |
| 5,844,010 A | 12/1998 | Burkhart et al. |
| 5,990,187 A | 11/1999 | Boinowitz et al. |
| 6,506,810 B2 | 1/2003 | Borgogelli et al. |
| 7,157,541 B2 | 1/2007 | Knott et al. |
| 7,671,104 B2 | 3/2010 | Heinemann et al. |
| 7,812,109 B2 | 10/2010 | Gloeckner et al. |
| 7,838,566 B2 | 11/2010 | Glos et al. |
| 8,247,467 B2 | 8/2012 | Mijolovic et al. |
| 8,303,843 B2 | 11/2012 | Glos et al. |
| 8,349,907 B2 | 1/2013 | Henning et al. |
| 8,420,731 B2 | 4/2013 | Cavaleiro et al. |
| 8,609,798 B2 | 12/2013 | Knott et al. |
| 8,623,984 B2 | 1/2014 | Henning et al. |
| 8,735,458 B2 | 5/2014 | Glos et al. |
| 8,906,974 B2 | 12/2014 | Glos et al. |
| 8,912,277 B2 | 12/2014 | Glos |
| 8,921,437 B2 | 12/2014 | Knott et al. |
| 8,946,310 B2 | 2/2015 | Glos et al. |
| 8,957,121 B2 | 2/2015 | Schiller et al. |
| 8,969,502 B2 | 3/2015 | Knott et al. |
| 9,056,952 B2 | 6/2015 | Eilbracht et al. |
| 9,217,074 B2 | 12/2015 | Glos et al. |
| 9,505,895 B2 | 11/2016 | Schmitz et al. |
| 2002/0103091 A1 | 8/2002 | Kodali |
| 2005/0010016 A1 | 1/2005 | Glockner et al. |
| 2006/0167125 A1 | 7/2006 | Bauer et al. |
| 2006/0229375 A1 | 10/2006 | Hsiao et al. |
| 2006/0293400 A1 | 12/2006 | Wiltz, Jr. et al. |
| 2007/0072951 A1 | 3/2007 | Bender et al. |
| 2007/0270518 A1 | 11/2007 | Nutzel |
| 2008/0125503 A1 | 5/2008 | Henning et al. |
| 2009/0054546 A1 | 2/2009 | Glockner et al. |
| 2009/0088488 A1 | 4/2009 | Bruckner et al. |
| 2010/0029587 A1 | 2/2010 | Brueckner et al. |
| 2010/0036011 A1 | 2/2010 | De Gans et al. |
| 2010/0240786 A1 | 9/2010 | Glos et al. |
| 2011/0062370 A1 | 3/2011 | Eilbracht et al. |
| 2011/0257280 A1 | 10/2011 | Glos et al. |
| 2011/0306694 A1 | 12/2011 | Glos et al. |
| 2012/0037036 A1 | 2/2012 | Veit et al. |
| 2012/0153210 A1 | 6/2012 | Glos et al. |
| 2012/0264843 A1 | 10/2012 | Glos |
| 2013/0035407 A1 | 2/2013 | Lobert et al. |
| 2013/0068990 A1 | 3/2013 | Eilbracht et al. |
| 2015/0057384 A1 | 2/2015 | Glos et al. |
| 2016/0096939 A1 | 4/2016 | Glos et al. |
| 2016/0152739 A1 | 6/2016 | Eilbracht et al. |
| 2016/0311961 A1 | 10/2016 | Klostermann et al. |
| 2016/0326330 A1 | 11/2016 | Schuette et al. |
| 2017/0152343 A1 | 6/2017 | Günther et al. |
| 2017/0174817 A1 | 6/2017 | Günther et al. |
| 2017/0226264 A1 | 8/2017 | Günther et al. |

FOREIGN PATENT DOCUMENTS

| | | | |
|---|---|---|---|
| CN | 103657518 A | 3/2014 | |
| CN | 103665385 A | 3/2014 | |
| DE | 1155909 A1 | 10/1963 | |
| DE | 1256898 B | 12/1967 | |
| DE | 1300256 A1 | 7/1969 | |
| DE | 2250855 A1 | 4/1973 | |
| DE | 3324287 A1 | 1/1985 | |
| DE | 10326893 A1 | 12/2004 | |
| DE | 102006000644 A1 | 7/2007 | |
| DE | 102007018812 A1 | 10/2008 | |
| DE | 102007045944 A1 | 4/2009 | |
| EP | 0040131 A1 | 11/1981 | |
| EP | 0275563 A1 | 7/1988 | |
| EP | 0731822 A1 | 9/1996 | |
| EP | 0731822 B1 | 9/1997 | |
| EP | 0867464 A1 | 9/1998 | |
| EP | 0867465 A1 | 9/1998 | |
| EP | 1161474 A1 | 12/2001 | |
| EP | 1211279 A1 | 6/2002 | |
| EP | 1520870 A1 | 4/2005 | |
| EP | 1678232 A2 | 7/2006 | |
| EP | 1712578 A1 | 10/2006 | |
| WO | 9515356 A1 | 6/1995 | |
| WO | 0047647 A1 | 8/2000 | |
| WO | 0058383 A1 | 10/2000 | |
| WO | 2004020497 A1 | 3/2004 | |
| WO | 2004096882 A1 | 11/2004 | |
| WO | 2005033167 A2 | 4/2005 | |
| WO | 2005085310 A2 | 9/2005 | |
| WO | 2006094227 A2 | 9/2006 | |
| WO | WO-2006094848 A2 * | 9/2006 | ......... C08G 18/0823 |
| WO | 2006116456 A1 | 11/2006 | |
| WO | 2008058913 A1 | 5/2008 | |
| WO | 2009058367 A1 | 5/2009 | |
| WO | 2009130470 A1 | 10/2009 | |
| WO | 2010028362 A1 | 3/2010 | |
| WO | 2011163133 A1 | 12/2011 | |
| WO | 2012031868 A1 | 3/2012 | |
| WO | 2013022932 A1 | 2/2013 | |
| WO | 2013156237 A2 | 10/2013 | |
| WO | 2015028295 A1 | 3/2015 | |
| WO | WO-2015042300 A1 * | 3/2015 | |
| WO | 2016020137 A1 | 2/2016 | |
| WO | 2016020140 A2 | 2/2016 | |
| WO | 2016020199 A1 | 2/2016 | |
| WO | 2016020200 A1 | 2/2016 | |
| WO | 2016020201 A1 | 2/2016 | |
| WO | 2016139044 A1 | 9/2016 | |
| WO | 2017005760 A1 | 1/2017 | |

OTHER PUBLICATIONS

German Language International Search Report dated Aug. 16, 2016 in PCT/EP2016/065895 (3 pages).
German Language Written Opinion dated Aug. 16, 2016 in PCT/EP2016/065895 (6 pages).
Günther et al., U.S. Appl. No. 15/323,154, filed Dec. 30, 2016.
International Search Report dated Aug. 16, 2016 in PCT/EP2016/065895 (2 pages).
Lüthge et al., U.S. Appl. No. 15/547,626, filed Jul. 31, 2017.

* cited by examiner

PRODUCTION OF POLYURETHANE FOAM

This application is a national stage application under 35 U.S.C. § 371 of International Application No. PCT/EP2016/065895 filed 6 Jul. 2016, which claims priority to EP Application No. 15175631.9 filed 7 Jul. 2015, the disclosures of which are expressly incorporated herein by reference.

FIELD

The present invention relates to the field of polyurethanes, especially that of polyurethane foams. More particularly, it relates to the production of polyurethane foams using specific OH-functional compounds, and additionally to the use of the foams which have been produced therewith. The polyurethane foams are especially rigid polyurethane foams.

BACKGROUND

For the purposes of the present invention, polyurethane (PU) is in particular a product obtainable by reaction of polyisocyanates and polyols or compounds having isocyanate-reactive groups. Further functional groups in addition to the polyurethane can also be formed in the reaction, examples being uretdiones, carbodiimides, isocyanurates, allophanates, biurets, ureas and/or uretonimines. Therefore, PU is understood in the context of the present invention to mean both polyurethane and polyisocyanurate, polyureas, and polyisocyanate reaction products containing uretdione, carbodiimide, allophanate, biuret and uretonimine groups. For the purposes of the present invention, polyurethane foam (PU foam) is understood to mean foam which is obtained as reaction product based on polyisocyanates and polyols or compounds having isocyanate-reactive groups. The reaction to give what is named a polyurethane can form further functional groups as well, examples being allophanates, biurets, ureas, carbodiimides, uretdiones, isocyanurates or uretonimines.

In most applications for polyurethane foams, the aim is to achieve a minimum density of the foam in order to minimize material expenditure and expense. This adversely affects the mechanical properties of a PU foam. Thus, a seat cushion having low density cannot achieve the resilience and hence seating comfort of a foam having higher density. This is likewise true of rigid foams which, at lower densities, have correspondingly poorer mechanical properties, for example compressive strength. In the case of closed-cell foams, the end result is shrinkage. After it has been produced, the foam loses volume because the polymer matrix cannot withstand the atmospheric pressure. This effect is known to those skilled in the art.

In practice, typically more reaction mixture is used than is theoretically needed to fill a particular volume. This so-called overpacking is needed to completely fill a mould and/or achieve a higher density, in order that a non-shrinking foam is ultimately available. This achieves the effect that correspondingly produced products, for example refrigerators, insulation panels or metal composite elements remain dimensionally stable and do not have any deformation.

In the case of free rise foams, for example spray foam, a reaction mixture, also called foam formulation, has to have an appropriate composition so that the necessary mechanical properties are achieved.

The specific problem addressed by the present invention was that of enabling the provision of PU foams having improved mechanical properties. Specifically, the PU foams are to have the particular feature of reduced shrinkage.

SUMMARY

It has now been found that, surprisingly, in the case of use of particular OH-functional compounds of the invention, based on partly or fully hydrogenated ketone-aldehyde resins, it is possible to produce PU foams having improved mechanical properties. The corresponding PU foams especially exhibit a lower tendency to shrinkage at the same density. This makes it possible to produce corresponding products such as cooling equipment, insulation panels or spray foam with a lower weight than before.

DETAILED DESCRIPTION

Against this background, the invention provides compositions suitable for production of polyurethane foams, comprising at least one isocyanate component, optionally a polyol component, optionally a catalyst which catalyses the formation of a urethane or isocyanurate bond, optionally a blowing agent,
wherein the composition additionally includes at least one OH-functional compound (OHC) obtainable by the partial or complete hydrogenation of ketone-aldehyde resins, wherein the OH-functional compound contains at least one structural element of the formula (1a) and optionally of the formulae (1b) and/or (1c),

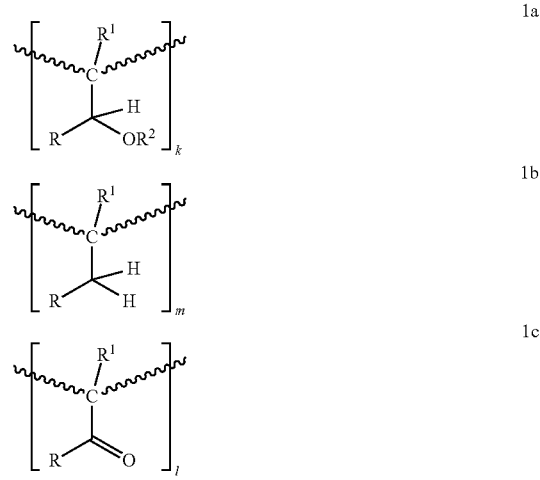

with
R=aromatic hydrocarbyl radical having 6-14 carbon atoms or (cyclo)aliphatic hydrocarbyl radical having 1-12 carbon atoms, where the hydrocarbyl radicals may optionally be substituted, for example by heteroatoms, halogen etc.,
$R^1$=H or $CH_2OH$,
$R^2$=H or a radical of the formula

where R' is hydrogen, methyl, ethyl or phenyl and y=1 to 50,
k=2 to 15, preferably 3 to 12, more preferably 4 to 11,
m=0 to 13, preferably 0 to 9, for example 1 to 9,
l is =0 to 2, for example 1 to 2,
where the sum of k+l+m is from 5 to 15, preferably from 5 to 12, and k>m with the proviso that at least 90 parts by weight of the polyols present have an OH number of greater than 100, preferably greater than 150 and more particularly greater than 200, based on 100 parts by weight of polyol components.

More particularly, polyol component and catalyst are obligatory, i.e. non-optional, which corresponds to a preferred embodiment of the invention.

The OH-functional compounds of the invention are obtainable by the partial or complete hydrogenation of ketone-aldehyde resins and contain at least 1 structural element of formula (1a) and optionally of the formulae (1b) and/or (1c)

The structural elements may be in alternating or random distribution, where the $CH_2$ group structural elements may be joined in a linear manner and/or the CH group structural elements in a branching manner.

In a preferred form of the invention, the OH-functional compounds of the invention contain at least 1 structural element of formula (2a) and optionally of formulae (2b) and/or (2c)

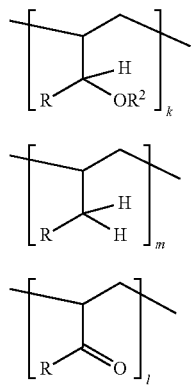

where the indices k, m and l, and the R and $R^2$ radicals may be defined as described above.

The subject-matter of the invention enables provision of PU foam, preferably rigid PU foam, featuring reduced shrinkage. The resulting PU foams are advantageously dimensionally stable and hydrolysis-stable and have excellent long-term characteristics. They advantageously have very good insulation properties, a very high insulation capacity, high mechanical strength, high stiffness, high compressive strength.

Ketone-aldehyde resins and the preparation thereof, especially by condensation of ketones with aldehydes, have already long been known. They are prepared, for example, by alkali-catalysed condensation of ketones with aldehydes. Useful aldehydes especially include formaldehyde, but also others, for example acetaldehyde and furfural. As well as aliphatic ketones, for example acetone, it is possible to use cyclic products in particular, such as cyclohexanone, methylcyclohexanone and cyclopentanone. Processes for production are described, for example, in DE 3324287 A1, DE 102007045944 A1, U.S. Pat. Nos. 2,540,885, 2,540,886, DE 1155909 A1, DE 1300256 and DE 1256898.

The OH-functional compounds (OHCs) for use in accordance with the invention, obtainable by the partial or complete hydrogenation of ketone-aldehyde resins, are also known per se.

The preparation and use thereof are described in detail in the following documents:

DE 102007018812 A1, the full disclosure of which is incorporated into this application by reference, describes the preparation of carbonyl-hydrogenated ketone-aldehyde resins and the partial or complete reaction of the hydroxyl groups of carbonyl-hydrogenated ketone-aldehyde resins with one or more alkylene oxides and optionally subsequent complete or partial esterification with organic and/or inorganic acids; what is more particularly described therein is the preparation of alkoxylated compounds of the formula (1a), i.e. with R2≠H, and the use thereof as dispersants. Likewise described therein are structural variants having bi-reactive ketones.

DE 102006000644 A1, the full disclosure of which is incorporated into this application by reference, describes, as component A) therein, the hydroxy-functional resins usable within the context of this present invention. More particularly described therein are hydrogenated conversion products of the resins formed from ketone and aldehyde. In the hydrogenation of the ketone-aldehyde resins, the carbonyl group of the ketone-aldehyde resin is converted to a secondary hydroxyl group; this can eliminate some of the hydroxyl groups, resulting in alkyl groups. Use is described in various sectors, but no polyurethane foams are described.

DE10326893A1, the full disclosure of which is incorporated into this application by reference, describes the preparation of ketone-aldehyde resins which can be used for preparation of the hydroxy-functional resins usable in accordance with the invention. Use is described in various sectors, but no polyurethane foams are described.

The ketone-aldehyde resins of the invention may contain aliphatic and/or cyclic ketones, preferably cyclohexanone and any alkyl-substituted cyclohexanones having one or more alkyl radicals having a total of 1 to 8 carbon atoms, individually or in a mixture. Examples include 4-tert-amyl-cyclohexanone, 2-sec-butylcyclohexanone, 2-tert butylcyclohexanone, 4-tert-butylcyclohexanone, 2-methylcyclohexanone and 3,3,5-trimethylcyclohexanone. Preference is given to cyclohexanone, 4-tert-butylcyclohexanone and 3,3,5-trimethylcyclohexanone.

Suitable aliphatic aldehydes are in principle unbranched or branched aldehydes, for example formaldehyde, acetaldehyde, n-butyraldehyde and/or isobutyraldehyde, and also dodecanal, etc.; but preference is given to using formaldehyde alone or in mixtures.

Formaldehyde is typically used as an about 25% to 40% by weight aqueous solution. Other use forms of formaldehyde are likewise possible, for example including use in the form of para-formaldehyde or trioxane. Aromatic aldehydes, for example benzaldehyde, may likewise be present in a mixture with formaldehyde.

As further monomers, the ketone-aldehyde resins of the invention may contain primarily ketones, alone or in a mixture, having aliphatic, cycloaliphatic, aromatic or mixed character. Examples include acetone, acetophenone, methyl ethyl ketone, heptan-2-one, pentan-3-one, methyl isobutyl ketone, cyclopentanone, cyclododecanone, mixtures of 2,2,4- and 2,4,4-trimethylcyclopentanone, cycloheptanone and cyclooctanone. Preference is given, however, to methyl ethyl ketone and acetophenone. In general, it is possible to use any ketones known in the literature to be suitable for ketone resin syntheses, generally all C—H-acidic ketones.

In a preferred embodiment, OH-functional compounds (OHCs) of the invention used are those which have been prepared by the processes described in DE102007018812A1 and DE 102006000644 A1.

As well as the OH-functional compounds (OHCs) of the invention, further isocyanate-reactive substances used as polyols may be all isocyanate-reactive components known according to the prior art.

The OH-functional compounds (OHCs) of the invention can be used in substance or else in a solvent. In this context, it is possible to use all suitable substances usable in the production of PU foams. Solvents used are preferably substances which are already used in standard formulations, for example OH-functional compounds, polyols, flame retardants, etc.

Since the OH-functional compounds (OHCs) of the invention can often have a melting point succeeding 50° C. or even exceeding 90° C., and since the production of PU foams preferably proceeds from liquid reaction mixtures, it may be preferable to dissolve the OH-functional compounds (OHCs) of the invention in other substances and/or to correspondingly increase the temperature of the starting materials, such that all components are in liquid form and preferably have a viscosity which enables good processing.

A preferred composition of the invention contains the following constituents:
a) at least one OH-functional compound (OHC) of the invention
b) optionally further isocyanate-reactive components, especially further polyols
c) at least one polyisocyanate and/or polyisocyanate prepolymer
d) optionally a catalyst which accelerates or controls the reaction of polyols a) and b) with the isocyanates c)
e) optionally a silicon-containing compound as surfactant
f) optionally one or more blowing agents
g) optionally further additives, fillers, flame retardants, etc.

It is preferable here that components b) and d) are obligatory.

In a preferred embodiment of the invention, the polyurethane foams are produced using a component having at least 2 isocyanate-reactive groups, preferably a polyol component, a catalyst and a polyisocyanate and/or a polyisocyanate prepolymer. The catalyst is introduced here especially via the polyol component. Suitable polyol components, catalysts and polyisocyanates and/or polyisocyanate prepolymers are described further down.

A further embodiment of the invention is the production of compositions for production of PU foams, these containing only a portion of constituents a) to g), especially containing constituents a) to g) except for the isocyanates c).

The OH-functional compounds (OHCs) for use in accordance with the invention may preferably be used in a total proportion by mass of 0.1 to 100.0 parts (pphp), preferably 0.5 to 100.0 parts, preferably 1 to 80 parts and more preferably 3 to 50 parts, based on 100 parts (pphp) of polyol component, polyols here being the entirety of all isocyanate-reactive compounds. Thus, when 100 parts (pphp) of OHCs are used, no further isocyanate-reactive components are present.

In a further preferred embodiment of the invention, the OH-functional compound (OHC) is present in a total proportion by mass of at least 30 parts, more preferably at least 35 parts and especially preferably at least 40 parts, based on 100 parts of polyol component.

Thus, in a preferred embodiment, only the OH-functional compounds (OHCs) are used, and no further polyols. In another, much more preferred embodiment, further polyol other than OHC is used in addition to the OH-functional compounds (OHCs).

The OH-functional compounds (OHCs) for use in accordance with the invention may accordingly be used either as additive in small amounts or as main component in large amounts, according to which profile of properties is desired.

When used as additive, they may preferably be used in a proportion by mass of 0.1 to 10 parts (pphp), preferably 0.5 to 8 and more preferably 0.9 to 6 parts, based on 100 parts (pphp) of polyol component, polyols here being the entirety of all isocyanate-reactive compounds.

When used as main component, they may preferably be used in a proportion by mass of 10 to 100 parts (pphp), preferably 20 to 95 parts and more preferably 30 to 90 parts, based on 100 parts (pphp) of polyol component, polyols here being the entirety of all isocyanate-reactive compounds.

Polyols suitable as polyol component b) for the purposes of the present invention are all organic substances having one or more isocyanate-reactive groups, preferably OH groups, and also formulations thereof. Preferred polyols are all polyether polyols and/or polyester polyols and/or hydroxyl-containing aliphatic polycarbonates, especially polyether polycarbonate polyols, and/or polyols of natural origin, known as "natural oil-based polyols" (NOPs) which are customarily used for producing polyurethane systems, especially polyurethane coatings, polyurethane elastomers or foams. Typically, the polyols have a functionality of from 1.8 to 8 and number average molecular weights in the range from 500 to 15 000. Typically, the polyols having OH numbers in the range from 10 to 1200 mg KOH/g are used.

For production of rigid PU foams, it is preferable to use polyols or mixtures thereof, with the proviso that at least 90 parts by weight of the polyols present, based on 100 parts by weight of polyol component, have an OH number greater than 100, preferably greater than 150 and especially greater than 200. The basic difference between flexible foam and rigid foam is that flexible foam exhibits elastic behaviour and is reversibly deformable. If the flexible foam is deformed by a force, it returns to its starting shape as soon as the force is removed. The rigid foam, by contrast, is permanently deformed.

Polyether polyols are obtainable by known methods, for example by anionic polymerization of alkylene oxides in the presence of alkali metal hydroxides, alkali metal alkoxides or amines as catalysts and by addition of at least one starter molecule which preferably contains 2 or 3 reactive hydrogen atoms in bonded form, or by cationic polymerization of alkylene oxides in the presence of Lewis acids, for example antimony pentachloride or boron trifluoride etherate, or by double metal cyanide catalysis. Suitable alkylene oxides contain from 2 to 4 carbon atoms in the alkylene moiety. Examples are tetrahydrofuran, 1,3-propylene oxide, 1,2-butylene oxide and 2,3-butylene oxide; ethylene oxide and 1,2-propylene oxide are preferably used. The alkylene oxides can be used individually, cumulatively, in blocks, in alternation or as mixtures. Starter molecules used may especially be compounds having at least 2, preferably from 2 to 8, hydroxyl groups, or having at least two primary amino groups in the molecule. Starter molecules used may, for example, be water, dihydric, trihydric or tetrahydric alcohols such as ethylene glycol, propane-1,2- and -1,3-diol, diethylene glycol, dipropylene glycol, glycerol, trimethylolpropane, pentaerythritol, castor oil, etc., higher polyfunctional polyols, in particular sugar compounds such as glucose, sorbitol, mannitol and sucrose, polyhydric phenols, resols such as oligomeric condensation products of phenol and formaldehyde and Mannich condensates of phenols, formaldehyde and dialkanolamines, and also melamine, or amines such as aniline, EDA, TDA, MDA and PMDA, more preferably TDA and PMDA. The choice of the suitable starter molecule is dependent on the respective field of application of the resulting polyether polyol in the production of polyurethane.

Polyester polyols are based on esters of polybasic aliphatic or aromatic carboxylic acids, preferably having from 2 to 12 carbon atoms. Examples of aliphatic carboxylic acids are succinic acid, glutaric acid, adipic acid, suberic acid, azelaic acid, sebacic acid, decanedicarboxylic acid, maleic acid and fumaric acid. Examples of aromatic carboxylic acids are phthalic acid, isophthalic acid, terephthalic acid and the isomeric naphthalenedicarboxylic acids. The polyester polyols are obtained by condensation of these polybasic carboxylic acids with polyhydric alcohols, preferably of diols or triols having from 2 to 12, more preferably having from 2 to 6, carbon atoms, preferably trimethylolpropane and glycerol.

In a preferred embodiment of the invention, polyester polyol(s) is/are present in the composition of the invention.

Polyether polycarbonate polyols are polyols containing carbon dioxide in the bonded form of the carbonate. Since carbon dioxide forms as a by-product in large volumes in many processes in the chemical industry, the use of carbon dioxide as comonomer in alkylene oxide polymerizations is of particular interest from a commercial point of view. Partial replacement of alkylene oxides in polyols with carbon dioxide has the potential to distinctly lower the costs for the production of polyols. Moreover, the use of $CO_2$ as comonomer is very advantageous in environmental terms, since this reaction constitutes the conversion of a greenhouse gas to a polymer. The preparation of polyether polycarbonate polyols by addition of alkylene oxides and carbon dioxide onto H-functional starter substances by use of catalysts is well known. Various catalyst systems can be used here: The first generation was that of heterogeneous zinc or aluminium salts, as described, for example, in U.S. Pat. Nos. 3,900,424 or 3,953,383. In addition, mono- and binuclear metal complexes have been used successfully for copolymerization of CO2 and alkylene oxides (WO 2010/028362, WO 2009/130470, WO 2013/022932 or WO 2011/163133). The most important class of catalyst systems for the copolymerization of carbon dioxide and alkylene oxides is that of double metal cyanide catalysts, also referred to as DMC catalysts (U.S. Pat. No. 4,500,704, WO 2008/058913). Suitable alkylene oxides and H-functional starter substances are those also used for preparing carbonate-free polyether polyols, as described above.

Polyols based on renewable raw materials, natural oil-based polyols (NOPs), for production of polyurethane foams are of increasing interest with regard to the long-term limits in the availability of fossil resources, namely oil, coal and gas, and against the background of rising crude oil prices, and have already been described many times in such applications (WO 2005/033167; US 2006/0293400, WO 2006/094227, WO 2004/096882, US 2002/0103091, WO 2006/116456 and EP 1678232). A number of these polyols are now available on the market from various manufacturers (WO2004/020497, US2006/0229375, WO2009/058367). Depending on the base raw material (e.g. soya bean oil, palm oil or castor oil) and the subsequent workup, polyols having a different profile of properties are the result. It is possible here to distinguish essentially between two groups: a) polyols based on renewable raw materials which are modified such that they can be used to an extent of 100% for production of polyurethanes (WO2004/020497, US2006/0229375); b) polyols based on renewable raw materials which, because of the processing and properties thereof, can replace the petrochemical-based polyol only in a certain proportion (WO2009/058367).

A further class of usable polyols is that of the so-called filled polyols (polymer polyols). A feature of these is that they contain dispersed solid organic fillers up to a solids content of 40% or more. SAN, PUD and PIPA polyols are among useful polyols. SAN polyols are highly reactive polyols containing a dispersed copolymer based on styrene-acrylonitrile (SAN). PUD polyols are highly reactive polyols containing polyurea, likewise in dispersed form. PIPA polyols are highly reactive polyols containing a dispersed polyurethane, for example formed by in situ reaction of an isocyanate with an alkanolamine in a conventional polyol.

A further class of useful polyols are those which are obtained as prepolymers via reaction of polyol with isocyanate in a molar ratio of preferably 100:1 to 5:1, more preferably 50:1 to 10:1. Such prepolymers are preferably made up in the form of a solution in polymer, and the polyol preferably corresponds to the polyol used for preparing the prepolymers.

A preferred ratio of isocyanate and polyol, expressed as the index of the formulation, i.e. as stoichiometric ratio of isocyanate groups to isocyanate-reactive groups (e.g. OH groups, NH groups) multiplied by 100, is in the range from 10 to 1000 and preferably in the range from 40 to 350. An index of 100 represents a molar ratio of 1:1 for the reactive groups.

The isocyanate components c) used are preferably one or more organic polyisocyanates having two or more isocyanate functions. Polyol components used are preferably one or more polyols having two or more isocyanate-reactive groups.

Isocyanates suitable as isocyanate components for the purposes of this invention are all isocyanates containing at least two isocyanate groups. Generally, it is possible to use all aliphatic, cycloaliphatic, arylaliphatic and preferably aromatic polyfunctional isocyanates known per se. Isocyanates are more preferably used in a range of from 60 to 200 mol %, relative to the sum total of isocyanate-consuming components.

Specific examples are: alkylene diisocyanates having 4 to 12 carbon atoms in the alkylene moiety, for example dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate or IPDI for short), hexahydrotolylene 2,4- and 2,6-diisocyanate and also the corresponding isomeric mixtures, and preferably aromatic diisocyanates and polyisocyanates such as tolylene 2,4- and 2,6-diisocyanate (TDI) and the corresponding isomeric mixtures, naphthalene diisocyanate, diethyltoluene diisocyanate, mixtures of diphenylmethane 2,4'- and 2,2'-diisocyanates (MDI) and polyphenyl polymethylene polyisocyanates (crude MDI) and mixtures of crude MDI and tolylene diisocyanates (TDI). Organic di- and polyisocyanates can be used individually or as mixtures thereof. It is likewise possible to use corresponding "oligomers" of the diisocyanates (IPDI trimer based on isocyanurate, biuret and uretdiones.) Furthermore, the use of prepolymers based on the abovementioned isocyanates is possible.

It is also possible to use isocyanates which have been modified by the incorporation of urethane, uretdione, isocyanurate, allophanate and other groups, called modified isocyanates.

Particularly suitable organic polyisocyanates, and so used with particular preference, are various isomers of tolylene diisocyanate (tolylene 2,4- and 2,6-diisocyanate (TDI), in pure form or as isomeric mixtures differing in composition), diphenylmethane 4,4'-diisocyanate (MDI), what is called "crude MDI" or "polymeric MDI" (containing the 2,4' and 2,2' isomers of MDI as well as the 4,4' isomer and also higher polycyclic products), and also the bicyclic product referred to as "pure MDI", which consists predominantly of 2,4'- and 4,4'-isomeric mixtures and/or prepolymers thereof. Examples of particularly suitable isocyanates are detailed, for example, in EP 1712578, EP 1161474, WO 00/58383, US 2007/0072951, EP 1678232 and WO 2005/085310, to which reference is made here in full.

d) Catalysts

Catalysts d) which are suitable for the purposes of the present invention are all compounds which are able to accelerate the reaction of isocyanates with OH functions, NH functions or other isocyanate-reactive groups. It is possible here to make use of the customary catalysts known from the prior art, including, for example, amines (cyclic, acyclic; monoamines, diamines, oligomers having one or more amino groups), organometallic compounds and metal salts, preferably those of tin, iron, bismuth and zinc. In particular, it is possible to use mixtures of a plurality of components as catalysts.

Component e) may be surface-active silicon compounds which serve as additives in order to optimize the desired cell structure and the foaming process. Therefore, such additives are also called foam stabilizers. In the context of this invention, it is possible here to use any Si-containing compounds which promote foam production (stabilization, cell regulation, cell opening, etc.). These compounds are sufficiently well known from the prior art.

The OH-functional compounds for use in accordance with the invention may advantageously have surface-active properties and hence at least partly assume the role of the stabilizers.

Surface-active Si-containing compounds may be any known compounds suitable for production of PU foam.

Siloxane structures of this type which are usable in the context of this invention are also described in the following patent documents, although these describe use only in conventional polyurethane foams, as moulded foam, mattress, insulation material, construction foam, etc:

CN 103665385, CN 103657518, CN 103055759, CN 103044687, US 2008/0125503, US 2015/0057384, EP 1520870 A1, EP 1211279, EP 0867464, EP 0867465, EP 0275563. These documents are hereby incorporated by reference and are considered to form part of the disclosure of the present invention.

In a further preferred embodiment of the invention, it is a feature of the use of the invention that the total amount of the silicon compound(s) used optionally is such that the proportion by mass based on the finished polyurethane is 0.01% to 10% by weight, preferably 0.1% to 3% by weight.

The use of blowing agents f) is optional, according to which foaming process is used. It is possible to work with chemical and physical blowing agents. The choice of the blowing agent here depends greatly on the type of system.

According to the amount of blowing agent used, a foam having high or low density is produced. For instance, foams having densities of 5 kg/m³ to 900 kg/m³ can be produced. Preferred densities are 8 to 800 kg/m³, more preferably 10 to 600 kg/m³, especially 30 to 150 kg/m³.

Physical blowing agents used may be corresponding compounds having appropriate boiling points. It is likewise possible to use chemical blowing agents which react with NCO groups to liberate gases, for example water or formic acid. These are, for example, liquefied $CO_2$, nitrogen, air, volatile liquids, for example hydrocarbons having 3, 4 or 5 carbon atoms, preferably cyclopentane, isopentane and n-pentane, hydrofluorocarbons, preferably HFC 245fa, HFC 134a and HFC 365mfc, chlorofluorocarbons, preferably HCFC 141b, hydrofluoroolefins (HFO) or hydrohaloolefins, for example 1234ze, 1233zd(E) or 1336mzz, oxygen compounds such as methyl formate, acetone and dimethoxymethane, or chlorinated hydrocarbons, preferably dichloromethane and 1,2-dichloroethane.

As additives g), it is possible to use all substances which are known from the prior art and are used in the production of polyurethanes, especially polyurethane foams, for example crosslinkers and chain extenders, stabilizers against oxidative degradation (known as antioxidants), flame retardants, surfactants, biocides, cell-refining additives, cell openers, solid fillers, antistatic additives, nucleating agents, thickeners, dyes, pigments, colour pastes, fragrances, and emulsifiers etc.

As flame retardant, the composition of the invention may comprise all known flame retardants which are suitable for producing polyurethane foams. Suitable flame retardants for the purposes of the present invention are preferably liquid organophosphorus compounds such as halogen-free organophosphates, e.g. triethyl phosphate (TEP), halogenated phosphates, e.g. tris(1-chloro-2-propyl) phosphate (TCPP) and tris(2-chloroethyl) phosphate (TCEP), and organic phosphonates, e.g. dimethyl methanephosphonate (DMMP), dimethyl propanephosphonate (DMPP), or solids such as ammonium polyphosphate (APP) and red phosphorus. Furthermore, halogenated compounds, for example halogenated polyols, and solids such as expandable graphite, aluminium oxides, antimony compounds and melamine are suitable as flame retardants. The inventive use of the OH-functional compounds (OHCs) enables the use of very high amounts of flame retardant, especially also liquid flame retardants, for example TEP, TCPP, TCEP, DMMP, which leads to very unstable formulations with conventional polyols. The inventive use of the OH-functional compounds (OHCs) even enables the use of flame retardants in proportions by mass of advantageously ≥30 pphp, preferably ≥50 pphp, especially ≥100 pphp, based on 100 parts (pphp) of polyol component, polyols here being the entirety of all isocyanate-reactive compounds. Such amounts lead otherwise to very unstable formulations, but the inventive use of the OH-functional compounds (OHCs) enables use of these amounts.

The invention provides a process for producing polyurethane foam, especially rigid polyurethane foam, by reacting one or more polyol components with one or more isocyanate components, wherein the reaction is effected in the presence of at least one OH-functional compound (OHC) obtainable by the partial or full hydrogenation of ketone-aldehyde resins, where this OH-functional compound contains at least one structural element of the formula (1a) and optionally of the formulae (1b) and/or (1c)

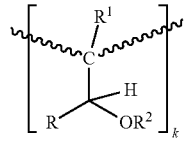

1a

-continued

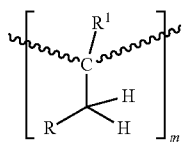

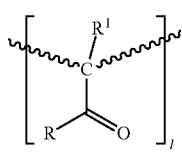

with
R=aromatic hydrocarbyl radical having 6-14 carbon atoms or (cyclo)aliphatic hydrocarbyl radical having 1-12 carbon atoms, where the hydrocarbyl radicals may optionally be substituted, for example by heteroatoms, halogen etc.
$R^1$=H, $CH_2OH$,
$R^2$=H, or a radical of the formula $—(CH_2—CH(R')O—)_y—H$
where R' is hydrogen, methyl, ethyl or phenyl and y=1 to 50,
k=2 to 15, preferably 3 to 12, more preferably 4 to 11,
m=0 to 13, preferably 0 to 9,
l=0 to 2,
where the sum of k+l+m is from 5 to 15, preferably from 5 to 12, and k>m,
with the proviso that at least 90 parts by weight of the polyols used have an OH number of greater than 100, preferably greater than 150 and especially greater than 200, based on 100 parts by weight of polyol components.

The foams to be produced in accordance with the invention have densities of preferably 5 kg/m³ to 900 kg/m³, more preferably 8 to 800, especially preferably 10 to 600 kg/m³, more particularly 30 to 150 kg/m³.

More particularly, it is possible to obtain closed-cell PU foams wherein the closed-cell content is advantageously >80%, preferably >90%. This corresponds to a very particularly preferred embodiment of the invention.

The closed cell content is determined in the context of this invention preferably in accordance with DIN ISO 4590 by pycnometer.

DIN 14315-1 stipulates various specifications for PU foam, called PU spray foam or else spray foam therein. Here, the foams are classified—among other parameters—according to their closed cell content.

| Level | Proportion of closed cells |
|---|---|
| CCC1 | <20% |
| CCC2 | 20 to 80% |
| CCC3 | >80 to 89% |
| CCC4 | ≥90% |

Generally, better lambda values are achieved with closed-cell PU foams (CCC3 and CCC4). A closed-cell foam requires a relatively high density in order that the polymer matrix is stable enough to withstand atmospheric pressure. Therefore, shrinkage may occur in the case of closed-cell foams.

The present invention advantageously enables an increase in the strength of the polymer matrix of the PU foam. The indentation hardness (determinable in accordance with DIN 53421) of the PU foam can be increased. In the case of closed-cell foams, shrinkage can be reduced.

The process of the invention for producing PU foams can be conducted by the known methods, for example by manual mixing or preferably by means of foaming machines. If the process is carried out by means of foaming machines, high-pressure or low-pressure machines can be used. The process of the invention can be carried out batchwise or continuously.

A preferred rigid polyurethane or polyisocyanurate foam formulation according to the present invention gives a foam density of from 5 to 900 kg/m³ and has the composition shown in Table 1.

TABLE 1

Composition of a preferred rigid polyurethane or polyisocyanurate formulation

| Component | Proportion by weight |
|---|---|
| OH-functional compound (OHC) of the invention | 0.1 to 100 |
| Polyol | 0 to 99.9 |
| Amine catalyst | 0 to 5 |
| Metal catalyst | 0 to 10 |
| Polyether siloxane | 0 to 5 |
| Water | 0.01 to 20 |
| Blowing agent | 0 to 40 |
| Further additives (flame retardants, etc.) | 0 to 300 |

Isocyanate index: 10 to 1000

For further preferred embodiments and configurations of the process of the invention, reference is also made to the details given in connection with the composition of the invention.

The present invention further provides a polyurethane foam, preferably rigid PU foam, obtainable by the process mentioned.

In a preferred embodiment, the foam is a rigid polyurethane foam, the density of which is 5 kg/m³ to 750 kg/m³, preferably 5 to 350 kg/m³.

In a further preferred embodiment of the invention, the polyurethane foam has a density of 5 kg/m³ to 900 kg/m³, more preferably 8 to 800, especially preferably 10 to 600 kg/m³, more particularly 30 to 150 kg/m³, and the closed-cell content is advantageously >80%, preferably >90%.

In a further preferred embodiment of the invention, the foam is a closed-cell PU foam (proportion of closed cells >80%, preferably ≥90%) produced with densities of greater than 25 kg/m³, more preferably greater than 30 kg/m³, especially preferably greater than 40 kg/m³.

In a preferred embodiment of the invention, the polyurethane foam includes 0.1% to 60% by mass, preferably 0.5% to 40% by mass and more preferably from 1% to 30% by mass of OH-functional compounds (OHC).

It is advantageously a feature of the polyurethane foams of the invention that they include at least one OH-functional compound (OHC) of the invention which has at least one structural element of the formula (1a), as defined above, and are preferably obtainable by the process of the invention.

The PU foams of the invention (polyurethane or polyisocyanurate foams) can be used as or for producing insulation materials, preferably insulation boards, refrigerators, insulating foams, vehicle seats, in particular automobile seats, roof liners, mattresses, filter foams, packaging foams or spray foams.

Particularly in the refrigerated warehouse, refrigeration appliances and domestic appliances industry, for example for production of insulating panels for roofs and walls, as insulating material in containers and warehouses for frozen goods, and for refrigeration and freezing appliances, the PU foams of the invention can be used advantageously.

Further preferred fields of use are in motor vehicle construction, especially for production of motor vehicle inner roof liners, bodywork parts, interior trim, cooled motor vehicles, large containers, transport pallets, packaging laminates, in the furniture industry, for example for furniture parts, doors, linings, in electronics applications.

Cooling apparatuses of the invention have, as insulation material, a PU foam of the invention (polyurethane or polyisocyanurate foam).

The invention further provides for the use of the PU foam as insulation material in refrigeration technology, in refrigeration equipment, in the construction sector, automobile sector, shipbuilding sector and/or electronics sector, as insulation panels, as spray foam, as one-component foam.

The invention further provides for the use of OH-functional compounds (OHC) obtainable by the partial or complete hydrogenation of ketone-aldehyde resins, wherein the OH-functional compound contains at least one structural element of the formula (1a) and optionally of the formulae (1b) and/or (1c),

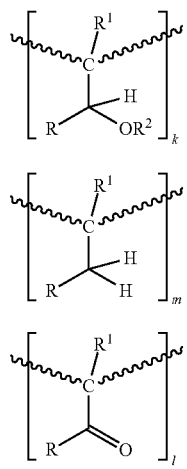

with
R=aromatic hydrocarbyl radical having 6-14 carbon atoms or (cyclo)aliphatic hydrocarbyl radical having 1-12 carbon atoms, where the hydrocarbyl radicals may optionally be substituted, for example by heteroatoms, halogen etc.,
$R^1$=H, $CH_2OH$,
$R^2$=H, or a radical of the formula —$(CH_2$—$CH(R')O$—$)_y$—H
where R' is hydrogen, methyl, ethyl or phenyl and y=1 to 50,
k=2 to 15, preferably 3 to 12, more preferably 4 to 11,
m=0 to 13, preferably 0 to 9,
l=0 to 2,
where the sum of k+l+m is from 5 to 15, preferably from 5 to 12, and k>m, in the production of PU foams, especially rigid PU foams,
especially for reducing shrinkage and/or as a foam-stabilizing component in the production of PU foams, more particularly rigid PU foams,
more particularly with the proviso that at least 90 parts by weight of the polyols used have an OH number of greater than 100, preferably greater than 150 and especially greater than 200, based on 100 parts by weight of polyol components.

Shrinkage can generally be determined by repeatedly measuring the volumes of the specimens after curing or storage times of varying length.

The inventive use for improving the fire resistance of the PU foam, preferably improving the flame retardancy and/or reducing the flame height, more particularly for compliance with the fire protection standard of at least B2 in accordance with DIN 4102-1, is a further preferred embodiment of the invention. More particularly, the evaluation here involved determining the fire properties for B2 classification (DIN 4102) by means of the flame height.

In addition, the inventive use of the OH-functional compounds (OHCs) enables the use of very high amounts of flame retardant, which leads to very unstable formulations with conventional polyols.

The subject-matter provided by the invention is illustratively described hereinbelow without any intention to limit the invention to these illustrative embodiments. Where ranges, general formulae or compound classes are specified hereinbelow, these are intended to include not only the relevant ranges or groups of compounds explicitly mentioned but also all subranges and subgroups of compounds that may be obtained by extracting individual values (ranges) or compounds. When documents are cited in the context of the present description, the contents thereof, particularly with regard to the subject-matter that forms the context in which the document has been cited, are considered in their entirety to form part of the disclosure content of the present invention. Unless stated otherwise, percentages are figures in percent by weight. When average values are reported hereinbelow, the values in question are weight averages, unless stated otherwise. When parameters which have been determined by measurement are reported hereinafter, they have been determined at a temperature of 25° C. and a pressure of 101.325 Pa, unless stated otherwise.

The examples listed below describe the present invention by way of example without any intention of limiting the invention, the scope of application of which arises from the entire description and the claims, to the embodiments specified in the examples.

EXAMPLES

Materials Used:
OH-functional compounds (OHCs) of the invention were prepared by the processes described in DE 102007018812. OHC-1 corresponds to the "carbonyl-hydrogenated ketone-aldehyde resin no. II" described in DE 102007018812.

1200 g of acetophenone, 220 g of methanol, 0.3 g of benzyltributylammonium chloride and 360 g of a 30% aqueous formaldehyde solution were initially charged and homogenized while stirring. Then 32 g of a 25% aqueous sodium hydroxide solution were added while stirring. At 80 to 85° C., 655 g of a 30% aqueous formaldehyde solution were then added while stirring over 90 min. The stirrer was switched off after stirring at reflux temperature for 5 h and the aqueous phase was separated from the resin phase. The crude product was washed with dilute acetic acid until a molten sample of the resin appears clear. Then the resin was dried by distillation. 1270 g of a pale yellowish resin were obtained. The resin was clear and brittle and had a melting point of 72° C. The Gardner colour number was 0.8 (50% in ethyl acetate). The formaldehyde content was 35 ppm. This product is referred to as base resin.

300 g of the base resin were dissolved in 700 g of tetrahydrofuran (water content about 7%). Then the hydrogenation was effected at 260 bar and 120° C. in an autoclave (from Parr) with a catalyst basket filled with 100 ml of a commercial Ru catalyst (3% Ru on alumina). After 20 h, the reaction mixture was let out of the reactor via a filter.

The reaction mixture was freed of the solvent under reduced pressure. This resulted in the inventive OH-functional compound OHC-1.

OHC-2 to OHC-5 were likewise prepared by oxyalkylation in accordance with DE102007018812. The following amounts of ethylene oxide (EO) or propylene oxide (PO) per OH function were added onto OHC-1:
OHC-2: OHC-1+3EO
OHC-3: OHC-1+5EO
OHC-4: OHC-1+3PO
OHC-5: OHC-1+5PO The compounds of the invention had the following OH numbers (in mg KOH/g):
OHC-1: OH number=325
OHC-2: OH number=225
OHC-3: OH number=188
OHC-4: OH number=158
OHC-5: OH number=127

The Si surfactants used were the following materials:
Siloxane 1: Polyether siloxane, as described in EP 1544235 A1 in Example 14.
Siloxane 2: Polyether siloxane, as described in US 2015/0057384 in Example 2.
PS 3152: polyester polyol from Stepan
PS 2352: polyester polyol from Stepan
PS 2412: polyester polyol from Stepan
R 471: Daltolac R 471, polyether polyol from Huntsman
R 251: Daltolac R 251, polyether polyol from Huntsman
Voranol RN 490: polyether polyol from Dow
Terate 203: polyester polyol from Invista
TCPP: tris(2-chloroisopropyl) phosphate from Fyrol
Kosmos 75 from Evonik Industries AG, catalyst based on potassium octoate
Kosmos 19 from Evonik Industries AG, dibutyltin dilaurate
PMDETA: TEGOAMIN PMDETA from Evonik Industries AG, amine catalyst
DMCHA: TEGOAMIN DMCHA from Evonik Industries AG, amine catalyst
MDI (44V20): Desmodur 44V20L from Bayer Materialscience, diphenylmethane 4,4'-diisocyanate (MDI) with isomeric and higher-functionality homologues
Stepanpol PS-3152: diethylene glycol phthalate polyester polyol, Stepan Company Foam Density Determination To determine the foam density, specimens having the dimensions of 10×10×10 cm were cut out of the foams. These were weighed in order to determine the masses. The volume was determined by the measurement of water displacement, by immersing the samples in a beaker containing water and measuring the increase in weight.

In this way, the volume of the specimens was ascertained. By repeatedly measuring the volume of the specimens after curing times of different length, the shrinkage was thus determined.

Examples: Production of PU Foams

In the case of use of inventive compounds of the formula (OHC) which were either in solid form or had a very high viscosity, these were dissolved in the flame retardant and used in this form.

The foams were produced by manual mixing. For this purpose, the inventive compounds, polyols, flame retardant, catalysts, water, conventional or inventive foam stabilizer and blowing agent were weighed into a beaker and mixed by means of a disc stirrer (6 cm in diameter) at 1000 rpm for 30 s. The blowing agent quantity which had evaporated during the mixing operation was determined by reweighing and replenished. Subsequently, the isocyanate (MDI) was added, and the reaction mixture was stirred with the stirrer described at 3000 rpm for 5 s. In the case of pour-in-place foaming, foaming was effected in the beaker itself; otherwise, the mixture was transferred into a paper-lined box of base area 27×14 cm.

In the case of flow applications, for example refrigerator systems, the mixture was introduced immediately into an aluminium mould of dimensions 145 cm×14.5 cm×3.5 cm which had been heated to 45° C. The amount of foam formulation used was determined such that it was 15% above the minimum amount necessary to fill the mould. According to the method of analysis, the specimens were cut out of the foam blocks after only 2 hours, or the samples were not taken until after one day.

In the case of the beaker foams, the rise behaviour, i.e. the outward shape, the surface of the foam and, using a cut surface within the upper part of the foam, the degree of internal defects and the pore structure were assessed visually on a scale from 1 to 10, with 10 representing a faultless foam and 1 a foam having an extremely high level of defects.

The compressive strengths of the foams were measured on cubic test specimens having an edge length of 5 cm in accordance with DIN 53421 up to a compression of 10% (the maximum compressive stress occurring in this measuring range is reported).

Tables 2, 3 and 4 summarize results with free rise foams (box).

In these tables, the examples labelled "-comp." are the noninventive comparative examples. The following are summarized here: the recipes used to produce the foams, the weights of the specimens (with dimensions of 10×10×10 cm) and the volumes of specimens and hence the shrinkage after various periods of time.

TABLE 2

| Formulation | Example | | | | | |
|---|---|---|---|---|---|---|
| | 1-comp. | 1 | 2-comp. | 2 | 3-comp. | 3 |
| PS 2352 | 100 | 94 | 100 | 94 | 100 | 94 |
| OHC-1 | 0 | 6 | 0 | 6 | 0 | 6 |
| Kosmos 75 | 3 | 3 | 3 | 3 | 3 | 3 |
| PMDETA | 0.5 | 0.5 | 0.5 | 0.5 | 0.5 | 0.5 |
| Siloxane 2 | 2 | 2 | 2 | 2 | 2 | 2 |
| TCPP | 20 | 20 | 20 | 20 | 20 | 20 |
| Water | 1 | 1 | 1 | 1 | 1 | 1 |
| Cyclopentane | 13 | 13 | 14 | 14 | 15 | 15 |
| MDI (44V20) | 180 | 180 | 180 | 180 | 180 | 180 |
| Specimen weight in g | 31.5 | 31.5 | 31.3 | 30.7 | 29.3 | 29.7 |
| Volume in ml after 2 h | 981.1 | 981.2 | 980.0 | 978.9 | 972.7 | 975.4 |
| Density in kg/m³ | 32.1 | 32.1 | 31.9 | 31.4 | 30.1 | 30.4 |
| Volume in ml after 24 h | 957.4 | 966.4 | 941.6 | 957.7 | 931.2 | 947.7 |
| 24 h shrinkage/% | 2.42 | 1.51 | 3.92 | 2.17 | 4.27 | 2.84 |
| Volume in ml after 6 d | 929.3 | 947.5 | 903.8 | 938.3 | 880.3 | 913.5 |
| 6 d shrinkage/% | 5.28 | 3.43 | 7.78 | 4.15 | 9.50 | 6.35 |

In all three examples, the foams which have been produced with the OH-functional compounds of the invention have lower shrinkage than the comparative examples. This was the case both after 24 hours and after 6 days.

TABLE 3

Purely water-blown systems

| Formulation | Example | |
| --- | --- | --- |
|  | 4-comp. | 4 |
| Daltolac R 471 | 30 | 30 |
| Daltolac R 251 | 70 | 64 |
| OHC-1 |  | 6 |
| DMCHA | 1.5 | 1.5 |
| Siloxane 1 | 2 | 2 |
| TCPP | 20 | 20 |
| Water | 5 | 5 |
| MDI (44V20) | 190 | 190 |
| Specimen weight in g | 32.0 | 31.5 |
| Volume in ml after 2 h | 971 | 963 |
| Density in kg/m$^3$ | 32.9 | 33.1 |
| Volume in ml after 24 h | 954 | 949 |
| 24 h shrinkage/% | 1.8 | 1.5 |
| Volume in ml after 6 d | 940 | 937 |
| 6 d shrinkage/% | 3.3 | 2.7 |

In Example 4, a purely water-blown formulation was examined. In this case, the foam which has been produced with OH-functional compounds of the invention has lower shrinkage than the comparative example. This was the case both after 24 hours and after 6 days.

Table 4 summarizes the results with the alkoxylated compounds OHC-2 to OHC-5.

TABLE 4

| Formulation | Example | | | | |
| --- | --- | --- | --- | --- | --- |
|  | 5-comp. | 5a | 5b | 5c | 5d |
| PS 2352 | 100 | 95 | 95 | 95 | 95 |
| OHC-2 | — | 5 |  |  |  |
| OHC-3 |  |  | 5 |  |  |
| OHC-4 |  |  |  | 5 |  |
| OHC-5 |  |  |  |  | 5 |
| Kosmos 75 | 3 | 3 | 3 | 3 | 3 |
| PMDETA | 0.5 | 0.5 | 0.5 | 0.5 | 0.5 |
| Siloxane 2 | 2 | 2 | 2 | 2 | 2 |
| TCPP | 10 | 10 | 10 | 10 | 10 |
| Water | 1 | 1 | 1 | 1 | 1 |
| Cyclopentane | 15 | 15 | 15 | 15 | 15 |
| MDI (44V20) | 180 | 180 | 180 | 180 | 180 |
| Specimen weight in g | 30.4 | 29.2 | 29.4 | 30.4 | 29.6 |
| Volume in ml after 2 h | 970.3 | 969.0 | 973.7 | 963.9 | 972.3 |
| Density in kg/m$^3$ | 31.4 | 30.1 | 30.2 | 31.5 | 30.4 |
| Volume in ml after 24 h | 935.4 | 943.5 | 952.26 | 942.4 | 962.8 |
| 24 h shrinkage/% | 3.6 | 2.6 | 2.2 | 2.2 | 1.0 |

In the case of the alkoxylated compounds too, it is already apparent after 24 hours that the foam formulations of the invention have a reduced tendency to shrinkage.

Examples for Improvement of Compressive Strength

For the foaming operations summarized in Table 5, the raw materials were heated to 40° C. in order that the viscosities did not become too high and good mixing of the components could be assured. Here, the compressive strengths were determined in the evaluation.

TABLE 5

| Formulation | Example | | | | | |
| --- | --- | --- | --- | --- | --- | --- |
|  | 6. | 6-comp. | 7 | 7-comp. | 8 | 8-comp. |
| PS 2412 | 70 | 100 |  |  | 70 | 100 |
| PS 3152 |  |  | 70 | 100 | 0 |  |
| OHC-1 | 30 |  | 30 |  | 30 |  |
| Kosmos 75 | 1.5 | 1.5 | 1.5 | 1.5 | 1.5 | 1.5 |
| PMDETA | 0.2 | 0.2 | 0.2 | 0.2 | 0.2 | 0.2 |
| Siloxane 1 | 2 | 2 | 2 | 2 | 2 | 2 |
| Water | 2 | 2 | 2 | 2 | 1.5 | 1.5 |
| MDI (44V20) | 200 | 200 | 200 | 200 | 200 | 200 |
| <Index> | 209 | 223 | 184 | 186 | 227 | 244 |
| Density in kg/m$^3$ | 44.7 | 43.6 | 45.5 | 46.9 | 48.9 | 49.8 |
| Compressive strength in kPa |  |  |  |  |  |  |
| vertical | 266 | 214 | 263 | 213 | 402 | 230 |
| horizontal | 176 | 140 | 205 | 145 | 189 | 153 |

Examples 6 to 8 show that, in the case of use of the compounds of the invention as compared with commercially available polyols having comparable OH numbers, higher compressive strengths were achievable in the foams without any need to increase the densities. The values measured for the inventive examples were higher throughout both in the direction of rise (vertical) and transverse to the direction of rise (horizontal) than in the noninventive examples. It is of particular interest here that the elevated foam hardness was achievable without an increase in the index or the amount of isocyanate.

Examples of Fire Characteristics (B2 Test)

For the foaming operations summarized in Table 6, the raw materials were heated to 40° C. in order that the viscosities did not become too high and good mixing of the components could be assured. Here, the fire properties for B2 classification (DIN 4102) by means of flame height were determined in the evaluation.

TABLE 6

| Formulation | Example | | |
| --- | --- | --- | --- |
|  | 9 | 10 | 11 |
| Datlolac 471 | 10 |  |  |
| PEG 400 |  |  | 60 |
| OHC-1 | 27 | 30 | 40 |
| TCPP | 63 | 70 |  |
| Kosmos 75 | 1.5 | 1.5 | 1.5 |
| DMCHA | 0.6 | 0.6 | 0.6 |
| Siloxane 1 | 2 | 2 | 2 |
| Water | 1 | 1 | 1 |
| MDI (44V20) | 180 | 150 | 220 |
| <Index> | 366 | 374 | 250 |
| Flame height in mm | 80 | 75 | 130 |

Examples 9 to 11 show that the compounds of the invention are suitable for production of foams having very good fire properties. Thus, it is possible in Examples 9 and 10 to work with very high amounts of flame retardant, which leads to very unstable formulations with conventional polyols. In Example 11, it was possible to completely dispense with flame retardants and nevertheless achieve a flame height of less than 150 mm.

Examples in Flow Applications for Improvement of Compressive Strength

The foaming operations summarized in Table 7 were conducted in the above-described aluminium mould—called the Bosch mould—in order to simulate the situation with flow stress in refrigerator production. The evaluations and measurements were effected after 24 hours.

TABLE 7

| Formulation | Example | | |
|---|---|---|---|
| | 12-comp. | 12a | 12b |
| Daltolac R 471 | 100 | 97.5 | 95 |
| OHC-1 | | 2.5 | 5 |
| TEGOAMIN DMCHA | 1.5 | 1.5 | 1.5 |
| Siloxane 1 | 2 | 2 | 2 |
| cyclo-Pentane | 13 | 13 | 13 |
| Water | 1.8 | 1.8 | 1.8 |
| MDI (44V20) | 170 | 170 | 170 |
| <Index> | 122 | 122 | 122 |
| λ value in mW/m · K | 23.6 | 23.5 | 23.7 |
| Compressive strength in kPa | | | |
| vertical | 184 | 195 | 220 |

Here too, it was found that the compressive strengths, i.e. the mechanical properties of the foams, can be improved with the compounds of the invention without having to accept losses of quality in the lambda values.

Examples with Inventive Compounds as Foam Stabilizer

The rigid PUR foam system specified in Table 8 was used for the pour-in-place applications.

TABLE 8

| Pour-in-place formulation | |
|---|---|
| Component | Proportion by weight |
| Voranol RN 490 | 70 parts |
| Terate 203 | 20 parts |
| Stepanpol PS 3152 | 10 parts |
| TCPP | 6 parts |
| N,N-Dimethylethanolamine | 0.35 part |
| DMCHA | 1.6 parts |
| Kosmos 19 | 0.07 |
| Water | 0.33 part |
| Foam Stabilizer | 1.3 parts |
| Cyclopentane | 21 parts |
| Desmodur 44V20L | 151 parts |

The results of the pour-in-place applications are reported in Table 9.

TABLE 9

| | | Results for pour-in-place | | |
|---|---|---|---|---|
| Ex. | Stabilizer | Internal defects (1-10) | Pore structure (1-10) | Rise charac- teristics | Surface |
| 13a | OHC-2 | 6 | 5 | 5 | 5 |
| 13b | OHC-3 | 6 | 6 | 5 | 5 |
| 13-comp. | Siloxane 1 | 8 | 7 | 6 | 7 |

Examples 13a and 13b show that the inventive compounds can be used as stabilizing component in the production of PU foams. Comparably good foams to those obtained with Si-containing stabilizers in Example 13-comp. are obtained.

The invention claimed is:

1. A rigid polyurethane foam comprising at least one isocyanate component, a polyol component, a catalyst which catalyzes the formation of a urethane or isocyanurate bond, and a blowing agent,
wherein the rigid polyurethane foam further comprises at least one OH-functional compound (OHC) from the partial or complete hydrogenation of ketone-aldehyde resins in the amount of by mass of at least 35 parts (pphp) based on 100 parts (pphp) of the polyol component, wherein this OH-functional compound contains at least one structural element of the formula (1 a) and of the formulae (1b) and/or (1c),

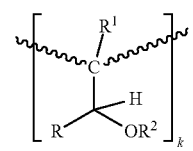

1a

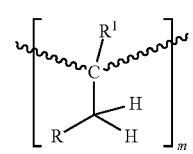

1b

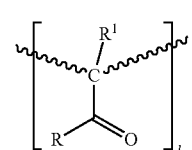

1c with
R is aromatic hydrocarbyl radical having 6-14 carbon atoms or (cyclo)aliphatic hydrocarbyl radical having 1-12 carbon atoms, where the hydrocarbyl radicals may be substituted,
$R^1$ is H, or $CH_2OH$,
$R^2$ is H, or a radical of the formula —$(CH_2$—$CH(R')O$—$)_y$—H,
wherein R' is hydrogen, methyl, ethyl or phenyl and y=1 to 50,
k is from 2 to 15,
m is from 0 to 13,
l is from 0 to 2,
where the sum of k+l+m is from 5 to 15, and k >m,
wherein at least 90 parts by weight of the polyols present have an OH number of greater than 100, based on 100 parts by weight of polyol components.

2. The rigid polyurethane foam according to claim 1, wherein the OH-functional compound (OHC) is present in a total proportion by mass of 40 parts, based on 100 parts polyol component, and wherein at least 90 parts by weight of the polyols present have an OH number of greater than 150, based on 100 parts by weight of polyol components.

3. The rigid polyurethane foam according to claim 1, wherein the OH-functional compound (OHC) is present in a total proportion by mass of from 30 to 9040 parts, based on 100 parts polyol component, and wherein at least 90 parts by weight of the polyols present have an OH number of greater than 200, based on 100 parts by weight of polyol components.

4. The rigid polyurethane foam according to claim 1, wherein polyester polyols are present.

5. A process for producing a rigid polyurethane foam by reacting one or more polyol components with one or more isocyanate components, wherein the reaction is effected in the presence of at least one OH-functional compound (OHC) obtained by the partial or full hydrogenation of ketone-aldehyde resins in the amount of by mass of 35 parts (pphp) based on 100 parts (pphp) of the polyol component, where this OH—functional compound contains at least one structural element of the formula (1a) and of the formulae (1b) and/or (1c)

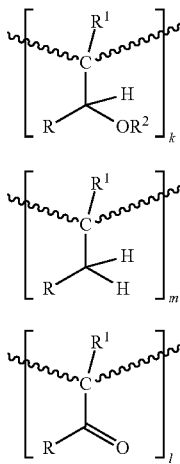

wherein
R is aromatic hydrocarbyl radical having 6-14 carbon atoms or (cyclo)aliphatic hydrocarbyl radical having 1-12 carbon atoms,
$R^1$ is H, or $CH_2OH$,
$R^2$ is H, or a radical of the formula $—(CH_2—CH(R')O—)_y—H$,
wherein R' is hydrogen, methyl, ethyl or phenyl and y=1 to 50,
k is from 2 to 15,
m is from 0 to 13,
l is from 0 to 2,
wherein the sum of k+l+m is from 5 to 15, and k >m,
wherein at least 90 parts by weight of the polyols used, have an OH number of greater than 150, based on 100 parts by weight of polyol components.

6. The rigid polyurethane foam obtained by a process according to claim 5 wherein the polyurethane foam has the OH-functional compound (OHC) is present in a total proportion by mass of from 10 to 8040 parts, based on 100 parts polyol component.

7. The rigid polyurethane foam according to claim 6, wherein the density is from 5 to 750 kg/m³, and wherein at least 90 parts by weight of the polyols present have an OH number of greater than 200, based on 100 parts by weight of polyol components.

8. The rigid polyurethane foam according to claim 6, wherein the closed-cell content of the polyurethane foam is >90%, the closed-cell content being determined in accordance with DIN ISO 4590.

9. The rigid polyurethane foam according to claim 6, wherein the density is from 5 to 750 kg/m³ and wherein the OH-functional compound (OHC) is present in a total proportion by mass of 40 parts based on 100 parts polyol component.

10. The rigid polyurethane foam according to claim 1, wherein k is from 3 to 12,
wherein the sum of k+l+m is from 5 to 12, and k>m, and
wherein at least 90 parts by weight of the polyols present have an OH number of greater than 150, based on 100 parts by weight of polyol components.

11. The rigid polyurethane foam according to claim 1, wherein k is from 4 to 11, and
wherein at least 90 parts by weight of the polyols present have an OH number of greater than 200, based on 100 parts by weight of polyol components.

12. The rigid polyurethane foam according to claim 1, wherein the OH-functional compound (OHC) is present in a total proportion by mass of from 35 to 80 parts, based on 100 parts polyol component.

13. The rigid polyurethane foam according to claim 1, wherein the OH-functional compound (OHC) is present in a total proportion by mass of from 40 to 80 parts, based on 100 parts polyol component.

14. The rigid polyurethane foam according to claim 6, wherein the density is from 5 to 350 kg/m³.

15. The rigid polyurethane foam according to claim 1, wherein the closed-cell content of the rigid polyurethane foam is greater than 90%, the closed-cell content being determined in accordance with DIN ISO 4590.

16. The rigid polyurethane foam according to claim 7, wherein the closed-cell content of the polyurethane foam is >90%, the closed-cell content being determined in accordance with DIN ISO 4590.

17. The rigid polyurethane foam according to claim 7, wherein the polyurethane foam has a density of from 5 to 350 kg/m³.

18. The rigid polyurethane foam according to claim 2, wherein the closed-cell content is greater than 90%, the closed-cell content being determined in accordance with DIN ISO 4590.

* * * * *

UNITED STATES PATENT AND TRADEMARK OFFICE
CERTIFICATE OF CORRECTION

PATENT NO. : 10,870,723 B2
APPLICATION NO. : 15/580191
DATED : December 22, 2020
INVENTOR(S) : Martin Glos Page 1 of 1

It is certified that error appears in the above-identified patent and that said Letters Patent is hereby corrected as shown below:

In the Claims

Column 20,
Line 51, "of from 30 to 9040 parts" should read -- of 40 parts --.

Column 21,
Line 41, "of from 10 to 8040 parts" should read -- of 40 parts --.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*